Oct. 5, 1943.　　　J. G. BAKER ET AL　　　2,331,160
DRIVE FOR BALANCING MACHINES
Filed Jan. 13, 1940

WITNESSES:

INVENTORS
John G. Baker and
Harry C. Werner.
BY
Paul E. Friedemann
ATTORNEY

Patented Oct. 5, 1943

2,331,160

UNITED STATES PATENT OFFICE 2,331,160

DRIVE FOR BALANCING MACHINES

John G. Baker, Evansville, Wis., and Harry C. Werner, Forest Hills, Pa., assignors to Westinghouse Electric & Manufacturing Company, East Pittsburgh, Pa., a corporation of Pennsylvania Application January 13, 1940, Serial No. 313,748

7 Claims. (Cl. 73—53)

Our invention relates to a supporting structure for a drive for a rotatable body which is so arranged that vibrations of the base or supporting surface will not be transmitted to the rotatable body.

More specifically, our invention is particularly adapted in machines for determining dynamic unbalance of a rotatable body, wherein the rotor is flexibly mounted and the driving means therefor is rigidly mounted, but wherein it is desired to eliminate vibrations transmitted through said rigid mounting to the rotatable body.

Figure 1:
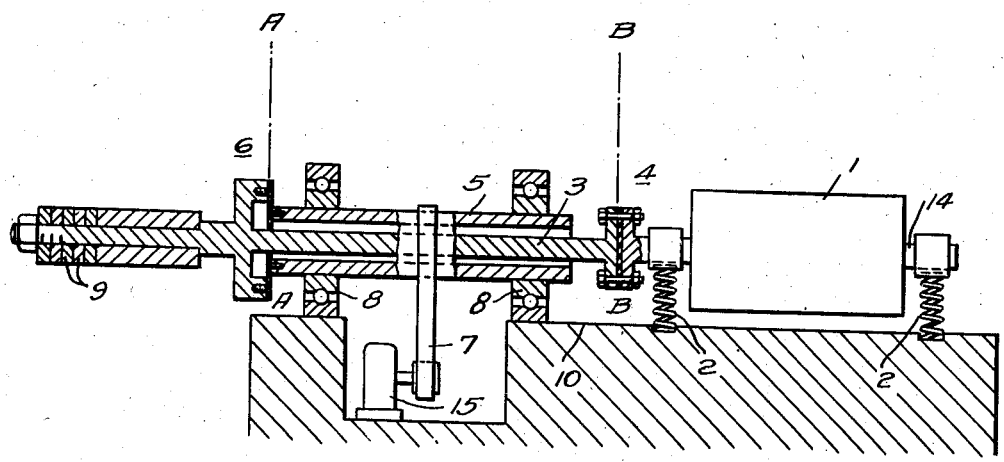
Figure 2:
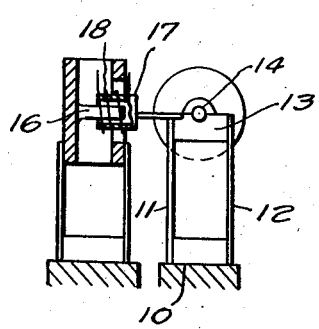

Other objects and advantages will become more apparent from a study of the following specification when considered in conjunction with the accompanying drawing, in which:

Figure 1 is a diagrammatic showing, partly in cross-section, of a portion of the dynamic balancing machine to which our invention may be applied; and Fig. 2 is a side view of a modification of one of the yieldably mounted supports for the rotatable body.

In dynamic balancing machines, it is important that no transverse forces due to floor or machine vibrations be transmitted to the rotor being balanced. Our invention is directed to apparatus for eliminating the possibility of such forces being transmitted through the rigidly supported coupling drive.

Referring more particularly to the drawing, the rotor 1 to be balanced is elastically mounted by springs 2 or other suitable yieldable means and driven by the solid drive shaft 3 through an elastic coupling 4 which allows free angular motion of the rotor. Rubber gaskets or other suitable yieldable coupling means may be used to make the joint elastic. The solid drive shaft 3 is driven by the hollow drive shaft 5 through an elastic universal joint 6, which is somewhat similar in construction to the elastic coupling 4. The hollow drive shaft 5 is supported by bearings 8, and is driven by a belt or pulley 7, which in turn is driven by a motor 15. Any transverse vibration of the machine in plane A also causes the solid drive shaft to vibrate in plane A. By adding weights 9 to the solid shaft in such a way that A becomes the center of percussion of the solid shaft 3 about B, a motion at A cannot transmit a transverse force through the coupling at B, therefore, the rotor does not feel the effect of the vibration regardless of amplitudes or frequency. In other words, coupling 4 becomes a null point or node for vibrations occurring in the solid drive shaft 3. This feature makes it possible to balance rotors to the same degree of accuracy regardless of floor or machine vibration.

This scheme may be applied to other machines where it is desired to avoid having transverse vibration forces enter some part of the machine through the drive.

Fig. 2 shows a special type of yieldable support for the rotor 1 in order to restrict the movements or vibrations of the rotor to one plane only, preferably the plane parallel to the supporting surface 10. Leaf springs 11 and 12 are supported at right angles to the supporting surface 10 and carry a bearing member 13, which supports shaft 14 of rotor 1. When the rotor vibrates due to unbalance, the vibration will be substantially in a single plane parallel to the supporting surface 10. Relative movement between a stationary member 16 and a movable core member 17 secured to bearing member 13 will induce a current in pick-up coil 18 which current is proportional to the amplitude of vibration and which can be measured by any suitable means well known in the art. It is to be understood that our invention is applicable either to a situation in which the rotor is free to vibrate in all planes, or to the case of restricted vibration, as described in connection with Fig. 2.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made.

We claim as our invention:

1. In combination, a yieldable supporting means for shafts projecting from a rotor to be balanced, a drive shaft flexibly secured to one of said rotor shafts by a flexible coupling, a second drive shaft concentric with respect to said first mentioned drive shaft and flexibly secured thereto by a second flexible coupling, supporting means for said second drive shaft, and weight means secured to the free end of said first mentioned drive shaft at such point that vibrations of said last mentioned supporting means cannot be transmitted to said rotor.

2. In combination, yieldable supporting means for shafts projecting from a rotor to be balanced, a drive shaft flexibly secured to one of said rotor shafts by a flexible coupling, a second drive shaft concentric with respect to said first mentioned drive shaft and flexibly secured thereto by a second flexible coupling, supporting means for said second drive shaft, and weight means secured to the free end of said first mentioned drive shaft at such point that the second coupling becomes the center of percussion of the first drive shaft about the first coupling so that a vibration at the second coupling cannot transmit a transverse force beyond the first coupling or to the rotor.

3. In combination, yieldable supporting means for shafts projecting from a rotor to be balanced, a drive shaft axially disposed with respect to one of said rotor shafts, a flexible coupling yieldingly connecting one end of the drive shaft to the said rotor shaft, a hollow, sleeve-like drive shaft surrounding said first drive shaft, an elastic universal joint yieldingly connecting one end of said sleeve-like drive shaft to said first drive shaft, a supporting means for said sleeve-like drive shaft, and weight means disposed along the free end of said first-mentioned drive shaft at such point that the universal joint becomes the center of percussion of said first-mentioned drive shaft about said flexible coupling so that a vibration at the universal joint cannot transmit a transverse force from the supporting means of the sleeve-like drive shaft beyond the flexible coupling or to the rotor.

4. In combination, yieldable supporting means for shafts projecting from a rotor to be balanced, a drive shaft axially disposed with respect to one of said rotor shafts, a flexible coupling yieldingly connecting one end of the drive shaft to the said rotor shaft, a hollow, sleeve-like drive shaft surrounding said first drive shaft, an elastic universal joint yieldingly connecting one end of said sleeve-like drive shaft to said first drive shaft, a pair of spaced supporting means for said sleeve-like drive shaft, a drive pulley which engages said sleeve-like drive shaft between said spaced supporting means for driving said shafts and said rotor, and weight means disposed along said first-mentioned drive shaft at a point which is further from said rotor than said universal joint so that the universal joint becomes the center of percussion of said first-mentioned drive shaft about said flexible coupling so that a vibration at the universal joint cannot transmit a transverse force from the supporting means of the sleeve-like drive shaft beyond the flexible coupling or to the rotor.

5. In combination, means for rotatably supporting a rotor to be balanced, a drive shaft, a flexible coupling universally connecting one end of said shaft to said rotor, driving means concentric to said shaft, and a flexible coupling connecting said driving means to said shaft at substantially its center of percussion with respect to said universal coupling.

6. In combination, means for rotatably supporting a rotor to be balanced, a drive shaft, a universal coupling connecting said shaft to said rotor, and means for transmitting a driving force to said shaft said means being positioned on said shaft at substantially the center of percussion of the shaft with respect to said universal coupling.

7. In combination, means for rotatably supporting a rotor to be balanced, a drive shaft for driving said rotor, and means for driving and supporting said shaft comprising a universal coupling connecting said shaft to said rotor, a rotatable support for said shaft connected to the shaft at its center of percussion with respect to said coupling, and means for transmitting a driving force to said shaft through said rotatable support.

JOHN G. BAKER.
HARRY C. WERNER.